(12) United States Patent
Hanai

(10) Patent No.: US 9,363,458 B2
(45) Date of Patent: Jun. 7, 2016

(54) INFORMATION PROCESSING APPARATUS, INFORMATION PROCESSING METHOD, PROGRAM, AND INFORMATION PROCESSING SYSTEM

(75) Inventor: Tomoyuki Hanai, Kanagawa (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 12/482,599

(22) Filed: Jun. 11, 2009

(65) Prior Publication Data

US 2009/0328108 A1 Dec. 31, 2009

(30) Foreign Application Priority Data

Jun. 25, 2008 (JP) .................................. 2008-165635

(51) Int. Cl.
*H04N 21/466* (2011.01)
*H04N 21/658* (2011.01)
(Continued)

(52) U.S. Cl.
CPC ......... *H04N 5/44543* (2013.01); *H04N 21/232* (2013.01); *H04N 21/2362* (2013.01); *H04N 21/25816* (2013.01); *H04N 21/25875* (2013.01); *H04N 21/26283* (2013.01); *H04N 21/4345* (2013.01); *H04N 21/4622* (2013.01); *H04N 21/4668* (2013.01); *H04N 21/47214* (2013.01);
(Continued)

(58) Field of Classification Search
CPC .................... H04N 21/26283; H04N 21/4668; H04N 21/6581; H04N 21/4622; H04N 21/4828
See application file for complete search history.

(56) References Cited

U.S. PATENT DOCUMENTS 6,208,799 B1 * 3/2001 Marsh ................ H04N 5/44543
  348/E5.007
6,424,791 B1 * 7/2002 Saib ............................ 386/291
(Continued)

FOREIGN PATENT DOCUMENTS

EP 0 940 985 A2 9/1999
EP 0 940 985 A3 9/1999
(Continued)

OTHER PUBLICATIONS

Office Action issued Feb. 15, 2011, in Japan Patent Application No. 2008-165635.
(Continued)

*Primary Examiner* — Pinkal R Chokshi
(74) *Attorney, Agent, or Firm* — Oblon, McClelland, Maier & Neustadt, L.L.P.

(57) ABSTRACT

Disclosed herein is an information processing apparatus including: transmission data acquisition section configured to acquire transmission data including program data and EPG data including program information for a predetermined period of time; EPG extraction section configured to extract the EPG data from the transmission data; program selection section configured to select a given program as a selected program; search word extraction section configured to extract a search word from the program information of the selected program; search word transmission section configured to transmit the search word to a program server; program information reception section configured to receive, from the program server, the program information including a program identification ID configured to identify a related program related to the selected program; program information storage section configured to store the program information; and processing section configured to identify the program by using the program identification ID, and perform a process targeted at the identified program.

11 Claims, 7 Drawing Sheets

(51) Int. Cl.
*H04N 21/462* (2011.01)
*H04N 5/445* (2011.01)
*H04N 21/2362* (2011.01)
*H04N 21/258* (2011.01)
*H04N 21/262* (2011.01)
*H04N 21/482* (2011.01)
*H04N 21/8405* (2011.01)
*H04N 21/232* (2011.01)
*H04N 21/434* (2011.01)
*H04N 21/472* (2011.01)
*H04N 21/654* (2011.01)

(52) U.S. Cl.
CPC ........... *H04N 21/482* (2013.01); *H04N 21/654* (2013.01); *H04N 21/6581* (2013.01); *H04N 21/8405* (2013.01)

(56) References Cited

U.S. PATENT DOCUMENTS

| | | | | |
|---|---|---|---|---|
| 6,714,722 | B1* | 3/2004 | Tsukidate | 386/291 |
| 7,810,119 | B2* | 10/2010 | Johnson | 725/53 |
| 8,065,697 | B2* | 11/2011 | Wright | H04H 60/27 725/10 |
| 8,086,093 | B2* | 12/2011 | Stuckman | 386/296 |
| 8,209,720 | B2* | 6/2012 | Potrebic | G06F 17/30265 725/46 |
| 8,505,050 | B2* | 8/2013 | Drazin | H04N 5/44543 725/40 |
| 2002/0059623 | A1* | 5/2002 | Rodriguez et al. | 725/91 |
| 2003/0023975 | A1* | 1/2003 | Schrader et al. | 725/51 |
| 2003/0226147 | A1 | 12/2003 | Richmond et al. | |
| 2004/0154039 | A1* | 8/2004 | Simms | H04N 7/173 725/39 |
| 2004/0221310 | A1* | 11/2004 | Herrington et al. | 725/46 |
| 2004/0237108 | A1* | 11/2004 | Drazin et al. | 725/56 |
| 2005/0172318 | A1 | 8/2005 | Dudkiewicz et al. | |
| 2005/0267994 | A1* | 12/2005 | Wong et al. | 709/246 |
| 2005/0289599 | A1* | 12/2005 | Matsuura et al. | 725/53 |
| 2006/0250650 | A1* | 11/2006 | Narahara et al. | 358/1.18 |
| 2007/0214488 | A1* | 9/2007 | Nguyen et al. | 725/134 |
| 2007/0265857 | A1* | 11/2007 | Shivaji Rao | H04N 7/165 709/231 |
| 2008/0059884 | A1* | 3/2008 | Ellis et al. | 715/721 |
| 2008/0060008 | A1* | 3/2008 | Wang et al. | 725/39 |
| 2009/0028529 | A1* | 1/2009 | Kuhns | 386/124 |
| 2010/0017571 | A1* | 1/2010 | Nakaji et al. | 711/155 |
| 2010/0107194 | A1* | 4/2010 | McKissick et al. | 725/40 |
| 2010/0169929 | A1* | 7/2010 | Choi et al. | 725/53 |
| 2011/0202958 | A1* | 8/2011 | Klappert | H04N 5/44543 725/39 |
| 2012/0072952 | A1* | 3/2012 | Vaysman et al. | 725/40 |
| 2012/0288260 | A1* | 11/2012 | Potrebic et al. | 386/297 |

FOREIGN PATENT DOCUMENTS

| | | |
|---|---|---|
| JP | 2001-101216 | 4/2001 |
| JP | 2002-374506 | 12/2002 |
| JP | 2003-319303 | 11/2003 |
| JP | 2006-157247 | 5/2006 |
| JP | 2007-124465 | 5/2007 |
| KR | 10-2002-0094005 | 12/2002 |

OTHER PUBLICATIONS

Korean Office Action issued May 7, 2015, in Patent Application No. 10-2009-0056398.

* cited by examiner

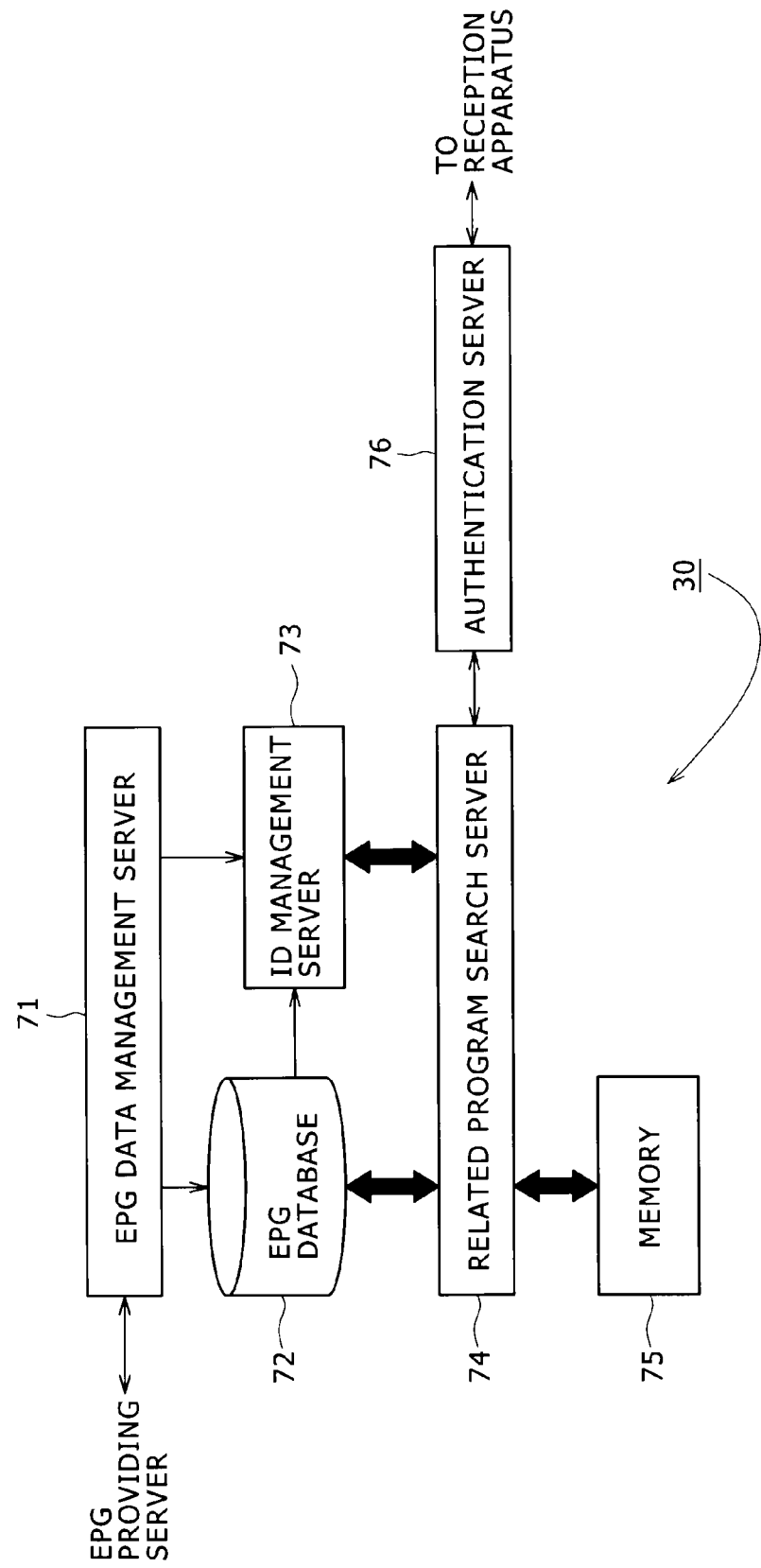

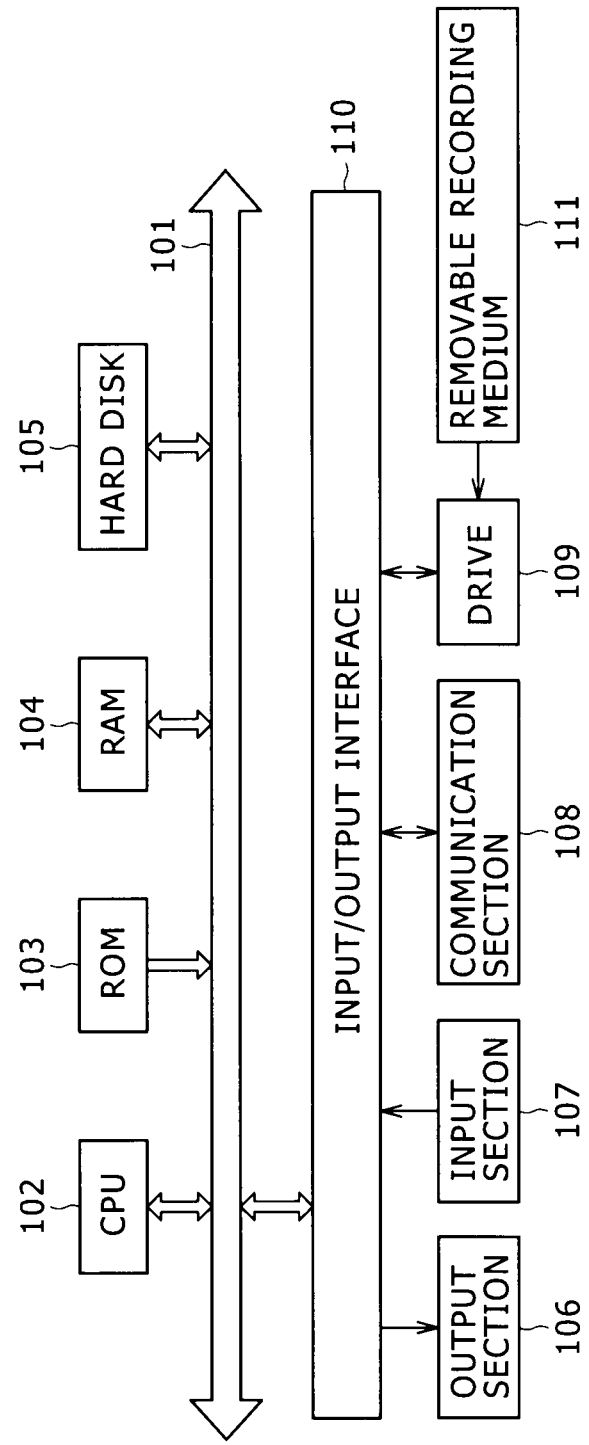

INFORMATION PROCESSING APPARATUS, INFORMATION PROCESSING METHOD, PROGRAM, AND INFORMATION PROCESSING SYSTEM

BACKGROUND OF THE INVENTION

1. Field of the Invention

The present invention relates to an information processing apparatus, an information processing method, a program, and an information processing system. In particular, the present invention relates to an information processing apparatus, an information processing method, a program, and an information processing system which enable accurate identification of a specific program from among an increased number of programs.

2. Description of the Related Art

For example, a broadcasting station that performs digital broadcasting transmits data including: image (video) data and audio data accompanying the image data, as data of a program (hereinafter referred to as "program data" as appropriate); EPG data used to display an electronic program guide (EPG); and so on.

The data transmitted by the broadcasting station (hereinafter referred to as "transmission data" as appropriate) is received by a reception apparatus such as a television receiver (TV), a hard disk (HD) recorder, or other types of video recorders.

The reception apparatus uses the EPG data to display the EPG.

For example, the EPG data includes information concerning programs (hereinafter referred to as "program information" as appropriate), such as titles of the programs (i.e., program names), channels (i.e., broadcast channels (broadcasting stations)), broadcast start times, broadcast end times (or broadcast times), people appearing in the programs, summaries of the programs (text describing the summaries of the programs), and so on.

In the reception apparatus, a specific program is identified using the title, the channel, the broadcast start time, and the like included in the EPG data as the program information, and a process targeted at the specific program is performed. Examples of such processes include a process of scheduling recording of the program, and a process of scheduling viewing of the program.

More specifically, if a user operates the reception apparatus so as to display the EPG, for example, the reception apparatus displays the EPG in accordance with the EPG data received from the broadcasting station. If the user further operates the reception apparatus so as to specify a specific program on the EPG displayed by the reception apparatus and schedule the recording of the specific program, the reception apparatus schedules the recording of the specific program specified by the user.

Recent years have seen a spread of reception apparatuses that perform a process of conducting a search in the EPG data received from the broadcasting station for a program that is likely to interest the user, based on a history of viewing of programs by the user or the like, and scheduling the recording of that program, for example. This process is called "auto-programmed recording," for example.

Since there is a limit to the data amount of the transmission data that can be transmitted from the broadcasting station (i.e., a transmission rate), it is difficult to allow a limitless amount of information related to the programs to be included in the transmission data. As such, there have been proposed a method of acquiring the information related to the programs by performing a search for web pages related to the programs (see Japanese Patent Laid-Open No. 2001-101216, for example), and a method of acquiring the information related to the programs by using a means other than the airwaves (see Japanese Patent Laid-Open No. 2002-374506, for example).

SUMMARY OF THE INVENTION

As described above, there is a limit to the data amount of the transmission data that can be transmitted from the broadcasting station. For this reason and others, in Association of Radio Industries and Businesses (ARIB) standard, for example, the maximum of the EPG data that can be included in the transmission data is EPG data for programs for 32 days (counting from the present).

In an actual operation of the digital broadcasting, the maximum of the EPG data that can be included in the transmission data is EPG data for programs for eight days.

Accordingly, in the aforementioned auto-programmed recording, for example, a search is performed in the programs for eight days to select the program for which the recording is scheduled.

However, there is a complaint that the programs for eight days are not sufficient as the target for searching for which the recording is scheduled, and there is a desire to perform a search in programs for more than eight days to select the program for which the recording is scheduled.

Meanwhile, in recent years, EPGs (so-called iEPGs) have been provided on web pages on the Internet. EPG data for programs for more than eight days can be provided on the web page. As such, according to a conceivable method, the reception apparatus may perform a search in the EPG data provided on the web page in addition to the EPG data received from the broadcasting station to select the program for which the recording is scheduled.

According to this method, the reception apparatus performs a search in the EPG data received from the broadcasting station and the EPG data provided on the web page to select the program for which the recording is scheduled. Then, the selected program is identified based on a channel on which the program is broadcast, the broadcast start time (including a date), and the broadcast end time, for example, and the recording of this program is scheduled.

The broadcast start time of the program for which the recording has been scheduled may be changed due to a change in the broadcast end time of a previous program, broadcasting of an extra program, or the like.

Even when a change in the broadcast start time has occurred, the reception apparatus will record, according to the schedule, a program that is transmitted from the broadcast start time to the broadcast end time specified in the schedule on the channel specified in the schedule. This results in a failure to record the right program to be recorded, i.e., a failed scheduled recording.

This failure is owing to the fact that accurate identification of the program is not necessarily achieved by specifying the channel, the broadcast start time (including the date), and the broadcast end time of the program.

According to a conceivable method of scheduling the recording of a program using the EPG data provided on the web page, the scheduling is performed in the following manner, for example. On the web page where the EPG data is provided, a program related to a program viewed by the user (hereinafter referred to as a "related program" as appropriate) is retrieved as a program that is likely to interest the user, and a title of the related program is provided to the reception apparatus. Then, the reception apparatus performs a search in the EPG data received from the broadcasting station to find the program with the title provided from the web page, and schedules the recording of the program.

However, this method may result in scheduling the recording of episodes of a program (hereinafter referred to as a "series program" as appropriate) that is broadcast every week, each episode addressing a different theme, regardless of the theme, for example.

More specifically, even in the case where the related program retrieved on the web page is actually an episode of such a weekly series program which addresses a particular theme and is broadcast in a particular week, the reception apparatus may schedule the recording of not only the episode of the series program broadcast in that particular week but also even other episodes of the series program which are broadcast in other weeks, based on the title of the related program retrieved on the web page.

This results in the scheduled recording of unwanted episodes of the program, i.e., episodes that address themes in which the user is not interested, in addition to the episode that addresses the theme in which the user is interested. This can be considered as a failed scheduled recording.

This failure is owing to the fact that the accurate identification of the program is not necessarily achieved by specifying the title of the program.

The present invention addresses the above-identified, and other problems associated with methods in the past and apparatuses, and enables accurate identification of a specific program from among an increased number of programs.

According to an embodiment of the present invention, there is provided an information processing apparatus including: transmission data acquisition means for acquiring transmission data including program data which is data of a program, and EPG (electronic program guide) data including program information for a predetermined period of time and used to display an EPG, the program information being information concerning programs; EPG extraction means for extracting the EPG data for the predetermined period of time from the transmission data; program selection means for selecting a given program as a selected program; search word extraction means for extracting, from the program information of the selected program included in the EPG data for the predetermined period of time, a search word to be used as a keyword for search; search word transmission means for transmitting the search word to a program server for searching for a program; program information reception means for receiving, from the program server, the program information including a program identification ID (identification) for identifying a related program related to the selected program obtained as a result of a search for the related program performed using the search word as the keyword; program information storage means for storing the program information included in the EPG data for the predetermined period of time and the program information of the related program; and processing means for identifying the program by using the program identification ID included in the program information stored in the program information storage means, and performing a process targeted at the identified program.

According to another embodiment of the present invention, there is provided an information processing method employed by an information processing apparatus, the method including the steps of: acquiring transmission data including program data which is data of a program, and EPG (electronic program guide) data including program information for a predetermined period of time and used to display an electronic program guide, the program information being information concerning programs; extracting the EPG data for the predetermined period of time from the transmission data; selecting a given program as a selected program; extracting, from the program information of the selected program included in the EPG data for the predetermined period of time, a search word to be used as a keyword for search; transmitting the search word to a program server configured to search for a program; receiving, from the program server, the program information including a program identification ID (identification) for identifying a related program related to the selected program obtained as a result of a search for the related program performed using the search word as the keyword; storing the program information included in the EPG data for the predetermined period of time and the program information of the related program in program information storage means for storing the program information; and identifying the program by using the program identification ID included in the program information stored in the program information storage means, and performing a process targeted at the identified program.

According to yet another embodiment of the present invention, there is provided a program for causing a computer to function as an information processing apparatus including: transmission data acquisition means for acquiring transmission data including program data which is data of a program, and EPG (electronic program guide) data including program information for a predetermined period of time and used to display an electronic program guide, the program information being information concerning programs; EPG extraction means for extracting the EPG data for the predetermined period of time from the transmission data; program selection means for selecting a given program as a selected program; search word extraction means for extracting, from the program information of the selected program included in the EPG data for the predetermined period of time, a search word to be used as a keyword for search; search word transmission means for transmitting the search word to a program server for searching for a program; program information reception means for receiving, from the program server, the program information including a program identification ID (identification) for identifying a related program related to the selected program obtained as a result of a search for the related program performed using the search word as the keyword; program information storage means for storing the program information included in the EPG data for the predetermined period of time and the program information of the related program; and processing means for identifying the program by using the program identification ID included in the program information stored in the program information storage means, and performing a process targeted at the identified program.

In the above embodiments of the present invention, the transmission data is acquired, and the EPG data for the predetermined period of time is extracted from the transmission data. The given program is selected as the selected program, the search word to be used as the keyword for the search is extracted from the program information of the selected program included in the EPG data for the predetermined period of time, and the search word is transmitted to the program server. Further, the program information including the program identification ID for identifying the related program is received from the program server, and the program information included in the EPG data for the predetermined period of time and the program information of the related program are stored in the program information storage means for storing the program information. Then, the program identification ID included in the program information stored in the program information storage means is used to identify the program, and the process targeted at that program is performed.

In the above embodiments of the present invention, the EPG data is acquired from the EPG providing server, and the EPG data is stored in the EPG data storage means. The search word transmitted from the reception apparatus is used as the keyword to perform a search in the EPG data storage means for the related program related to the selected program. Then, the program information including the program identification ID for identifying the related program obtained as a result of the search for the related program is provided to the reception apparatus.

According to yet another embodiment of the present invention, there is provided an information processing system including: a reception apparatus for acquiring transmission data including program data which is data of a program and EPG data for a predetermined period of time; and a program server for searching for the program. The reception apparatus includes: transmission data acquisition means for acquiring the transmission data; EPG extraction means for extracting the EPG data for the predetermined period of time from the transmission data; program selection means for selecting a given program as a selected program; search word extraction means for extracting, from the program information of the selected program included in the EPG data for the predetermined period of time, a search word to be used as a keyword for search; search word transmission means for transmitting the search word to the program server; program information reception means for receiving, from the program server, the program information including a program identification ID (identification) for identifying a related program related to the selected program obtained as a result of a search for the related program performed using the search word as the keyword; program information storage means for storing the program information included in the EPG data for the predetermined period of time and the program information of the related program; and processing means for identifying the program by using the program identification ID included in the program information stored in the program information storage means, and performing a process targeted at the identified program. The program server includes: EPG data acquisition means for acquiring, from an EPG providing server for providing the EPG data, the EPG data; EPG data storage means for storing the EPG data; program search means for performing a search for the related program related to the selected program using the search word transmitted from the reception apparatus as the keyword, with programs corresponding to the program information included in the EPG data stored in the EPG data storage means as a target of the search; and providing means for providing, to the reception apparatus, the program information including the program identification ID for identifying the related program obtained as a result of the search for the related program.

In the above embodiment of the present invention, in the reception apparatus, the transmission data is acquired, and the EPG data for the predetermined period of time is extracted from the transmission data. Further, the given program is selected as the selected program, the search word to be used as the keyword for the search is extracted from the program information of the selected program included in the EPG data for the predetermined period of time, and the search word is transmitted to the program server. Further, the program information including the program identification ID for identifying the related program is received from the program server, and the program information included in the EPG data for the predetermined period of time and the program information of the related program are stored in the program information storage means. Then, the program identification ID included in the program information stored in the program information storage means is used to identify the program, and the process targeted at that program is performed.

On the other hand, in the program server, the EPG data is acquired from the EPG providing server and stored in the EPG data storage means. The search word transmitted from the reception apparatus is used as the keyword to perform a search in the EPG data storage means for the related program related to the selected program. Then, the program information including the program identification ID for identifying the related program is provided to the reception apparatus.

Note that the program can be provided by being transferred via a transmission medium, or by being recorded on a recording medium.

According to the above-described embodiments of the present invention, it is possible to accurately identify a specific program from among an increased number of programs.

BRIEF DESCRIPTION OF THE DRAWINGS

FIG. 4 is a block diagram illustrating an exemplary structure of a program server;

FIG. 7 is a block diagram illustrating an exemplary structure of a computer according to an embodiment of the present invention.

DETAILED DESCRIPTION OF THE PREFERRED EMBODIMENTS

Figure 1:
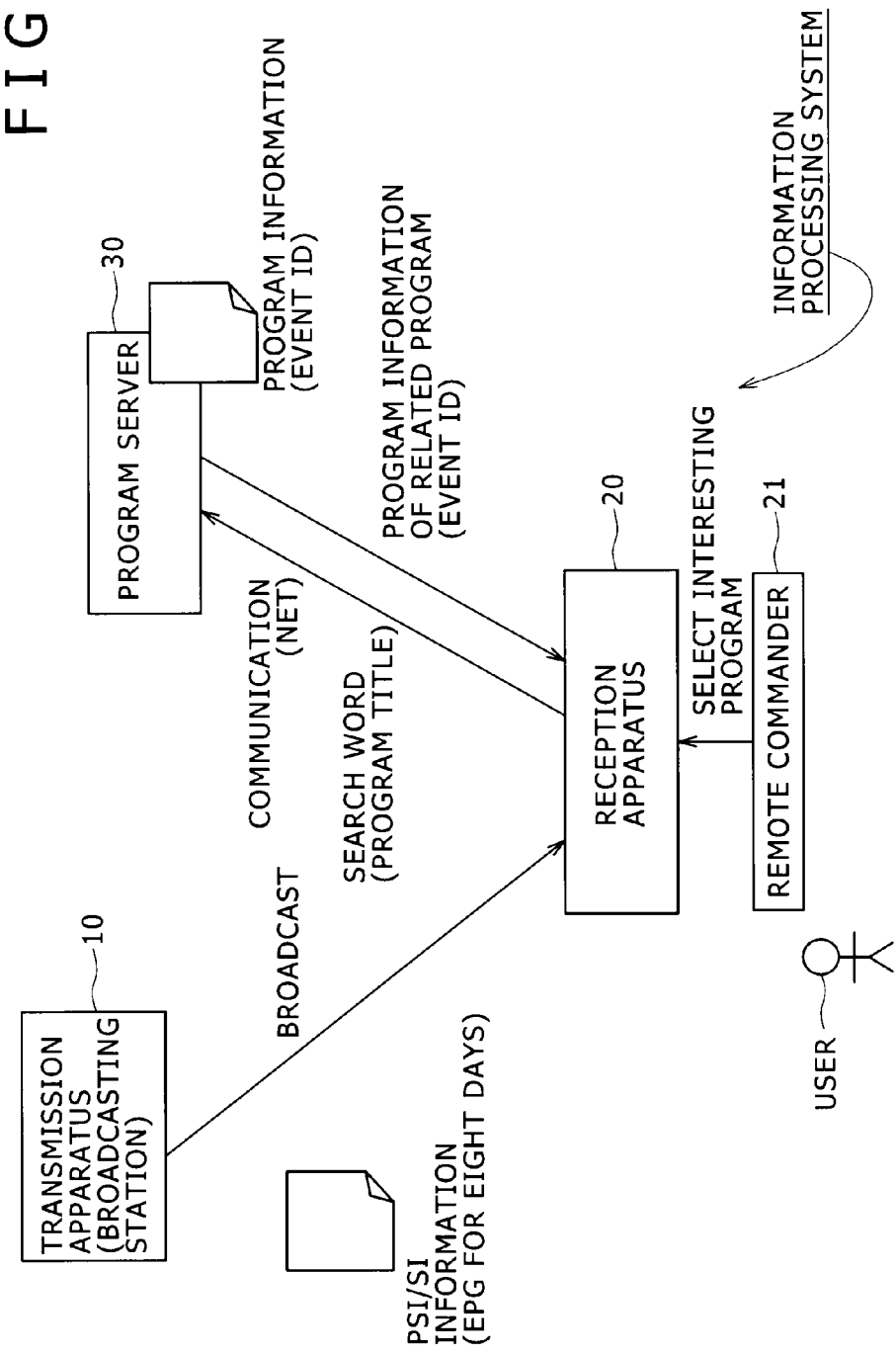
FIG. 1 is a block diagram illustrating an exemplary structure of an information processing system according to an embodiment of the present invention.

FIG. 1 is a block diagram illustrating an exemplary structure of an information processing system according to an embodiment of the present invention. Note that the term "system" refers to a logical collection of a plurality of devices, regardless of whether all of the devices are contained in a single housing.

The information processing system as illustrated in FIG. 1 includes a transmission apparatus 10, a reception apparatus 20, and a program server 30.

The transmission apparatus 10 is installed, for example, in a broadcasting station that performs digital broadcasting or the like, and transmits (broadcasts) transmission data via the digital broadcasting. Here, the transmission data includes program data. The transmission data further includes EPG data which includes program information for a predetermined period of time and is used to display an EPG.

Specifically, the transmission apparatus 10 transmits, as the transmission data, the program data and PSI/SI (Program Specific Information/Service Information) information, for example.

The PSI/SI information includes the EPG data for the predetermined period of time, e.g., eight days, that is, EPG data including the program information concerning programs for eight days.

The program information in the EPG data for eight days, which is included in the transmission data transmitted via the digital broadcasting, includes titles of the programs, channels, broadcast start times, broadcast end times, genres, summaries (detailed information), event IDs (Identifications), and so on.

Here, the event ID is an ID for identifying an event. Therefore, the event ID can be used to identify a program corresponding to an event.

Regarding digital broadcasting in Japan, the event IDs for programs in communication satellite (CS) digital broadcasting are unique throughout whole services corresponding to channels (broadcasting stations). Meanwhile, the event IDs for programs in broadcasting satellite (BS) digital broadcasting and terrestrial digital broadcasting are unique on a service-by-service basis (within each service).

Accordingly, regarding the programs in the CS digital broadcasting, the event IDs can be used to uniquely identify the programs throughout the whole services. Regarding the programs in the BS digital broadcasting and the terrestrial digital broadcasting, the event IDs can be used to uniquely identify the programs within each service (channel).

In other words, the programs in the CS digital broadcasting can be identified based on the event IDs alone, whereas the programs in the BS digital broadcasting and the terrestrial digital broadcasting can be identified based on the event IDs if the service is known.

It is assumed here that an ID that (uniquely) identifies a program is referred to as a "program identification ID." Then, regarding the programs in the CS digital broadcasting, the event ID serves as the program identification ID. Meanwhile, regarding the programs in the BS digital broadcasting and the terrestrial digital broadcasting, a set of information for identifying the channel and the event ID, e.g., a set of a service ID and the event ID, serves as the program identification ID. The service ID is an ID for identifying the service corresponding to the channel.

Note here that the event ID (and the service ID) can be used to accurately identify a given program.

More specifically, even if the broadcast start time of the given program is changed, for example, the event ID can be used to identify the given program even with the changed broadcast start time (because information concerning the change in the broadcast start time of the program identified by the event ID is transmitted via so-called section data).

Moreover, the event ID can be used to identify each episode of a series program, for example.

The reception apparatus 20 is, for example, a TV, a video recorder, or the like installed in a home or the like. The reception apparatus 20 functions as an information processing apparatus that receives and thereby acquires the transmission data transmitted from the transmission apparatus 10.

That is, the reception apparatus 20 receives and thereby acquires the transmission data transmitted from the transmission apparatus 10.

In addition, in response to an operation on a remote commander 21 by a user, for example, the reception apparatus 20 selects, as a selected program, a specific program such as a program in which the user is interested, for example. Then, the reception apparatus 20 extracts, from the program information of the selected program in the EPG data included in the transmission data, a search word to be used as a keyword for search (e.g., a title of the selected program), and transmits the extracted search word to the program server 30.

Further, the reception apparatus 20 receives, from the program server 30, program information including a program identification ID, such as an event ID, identifying a related program related to the selected program, which is obtained as a result of a search for the related program performed using the search word as a keyword in response to the transmission of the search word.

Then, the reception apparatus 20 identifies the program using the program information in the EPG data for eight days included in the transmission data transmitted from the transmission apparatus 10, and the program identification ID, such as the event ID, included in the program information transmitted from the program server 30, and performs a process targeted at that program (hereinafter referred to as a "program related process" as appropriate).

Here, examples of such program related processes include a process of scheduling recording of the program, a process of scheduling viewing of the program, a process of recommending the recording, viewing, or the like of the program (e.g., a process of displaying an indication that there is a recommended program).

Data exchange between the reception apparatus 20 and the program server 30 is carried out via a network such as the Internet, for example.

The program server 30 is, for example, a server or the like on the Internet. The program server 30 functions as an information processing apparatus that performs program search.

Specifically, the program server 30 acquires (collects) the EPG data from an EPG providing server (not shown) on the Internet for providing the EPG data.

Here, the EPG providing server is, for example, a server managed by a broadcasting station. The EPG providing server provides EPG data for a longer period of time than eight days, which is covered by the EPG data included in the PSI/SI information transmitted from the transmission apparatus 10. Note that, of the program information in the EPG data provided by the EPG providing server, some pieces of program information about programs that are to be broadcast more than eight days later may be lacking in part of the information, such as the event ID, for a reason such as that the program has not been assigned the event ID yet.

As described above, when the search word of the selected program (i.e., the search word extracted from the program information of the selected program) has been transmitted from the reception apparatus 20, the program server 30 performs a search in the EPG data provided from the EPG providing server for the related program related to the selected program, using that search word as a keyword. Then, the program server 30 transmits and thereby provides, to the reception apparatus 20, the program information including the program identification ID for identifying the related program obtained as a result of the search for the related program.

It has been assumed in FIG. 1 that the transmission apparatus 10 transmits the transmission data via the digital broadcasting. Note, however, that the transmission data may be transmitted by multicasting via a network such as the Internet, as in so-called Internet Protocol Television (IPTV), for example.

Figure 2:
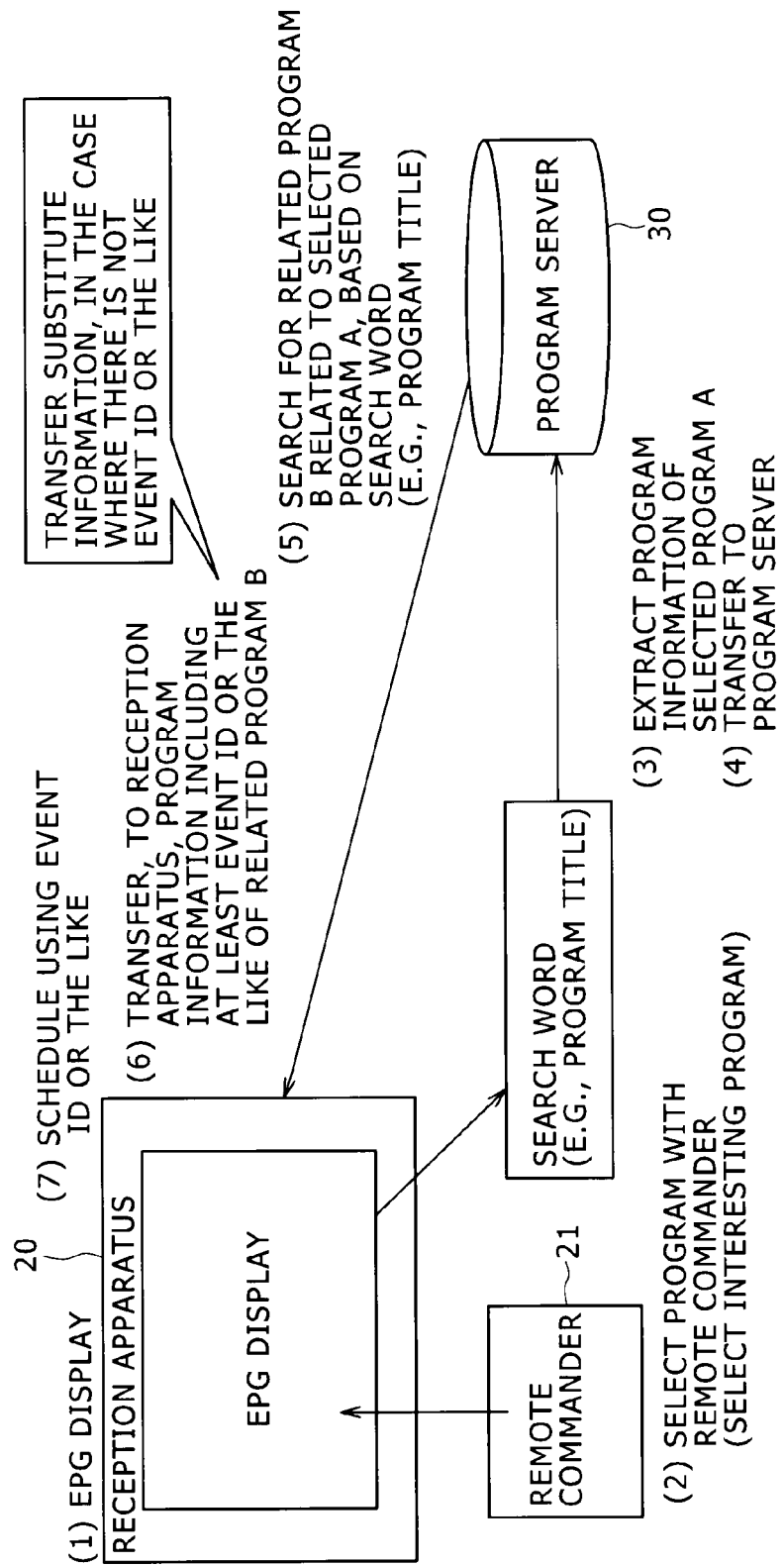
FIG. 2 illustrates an outline of a procedure performed in the information processing system.

Referring to FIG. 2, an outline of a procedure performed in the information processing system of FIG. 1 will now be described below.

The transmission apparatus 10 transmits the transmission data including the program data, the EPG data for eight days, and so on. The transmission data is received by the reception apparatus 20.

Meanwhile, the program server 30 acquires the EPG data from the EPG providing server, associates the program information included in the EPG data with the program identification IDs for identifying the programs corresponding to the program information appropriately, and store them in a correlated manner.

Meanwhile, in response to the operation on the remote commander 21 by the user, the reception apparatus 20 displays the EPG based on the EPG data included in the transmission data transmitted from the transmission apparatus 10 (see (1)).

When the user thereafter operates the remote commander 21 so as to specify a specific program (i.e., a program section of the specific program) on the EPG displayed by the reception apparatus 20, the reception apparatus 20 selects, as the selected program, the specific program (e.g., program A) specified by the user by operating the remote commander 21, for example (see (2)).

Further, the reception apparatus 20 extracts, as the search word, from program information of the selected program A in the EPG data included in the transmission data, a specific word or the like, in the case where the specific word is included in a text describing a title of the selected program A, a person (i.e., a name of the person) who appears in the selected program A, and a summary of the selected program A, for example (see (3)). Then, the reception apparatus 20 transmits (transfers) the search word to the program server 30 via the network (not shown) such as the Internet (see (4)).

The program server 30 receives the search word from the reception apparatus 20, and uses the search word as the keyword to perform a search in the EPG data provided from the EPG providing server for related program B related to the selected program A (see (5)). Then, the program server 30 transmits (transfers), to the reception apparatus 20 via the network, the program information including the program identification ID for identifying the related program B obtained as a result of the search for the related program B (see (6)).

Note that, as described above, some of the programs whose program information is included in the EPG data provided from the EPG providing server may not yet have been assigned the event ID as the program identification ID. In the case where the related program B is one of such programs, the program server 30 may wait until the EPG data including the program information of the related program B assigned with the event ID is acquired (collected), and then transmit to the reception apparatus 20 the program information including the event ID as the program identification ID for the related program B.

Alternatively, in the case where the related program B is a program to which the event ID as the program identification ID has not been assigned yet, the program server 30 may transmit, to the reception apparatus 20, program information of the program B including substitute information that substitutes for the program identification ID, for example.

Adoptable examples of the substitute information include the channel, the broadcast start time, and the broadcast end time (or the broadcast time) of the related program B. In this case, however, accurate identification of the related program B may not be achieved, as described above.

When the program information of the related program B has been transmitted from the program server 30, the reception apparatus 20 receives this program information. Then, the reception apparatus 20 uses the program identification ID, such as the event ID, included in the program information to identify the related program B, and performs the program related process targeted at the related program B, e.g., the process of scheduling the recording of the related program B (see (7)).

Figure 3:
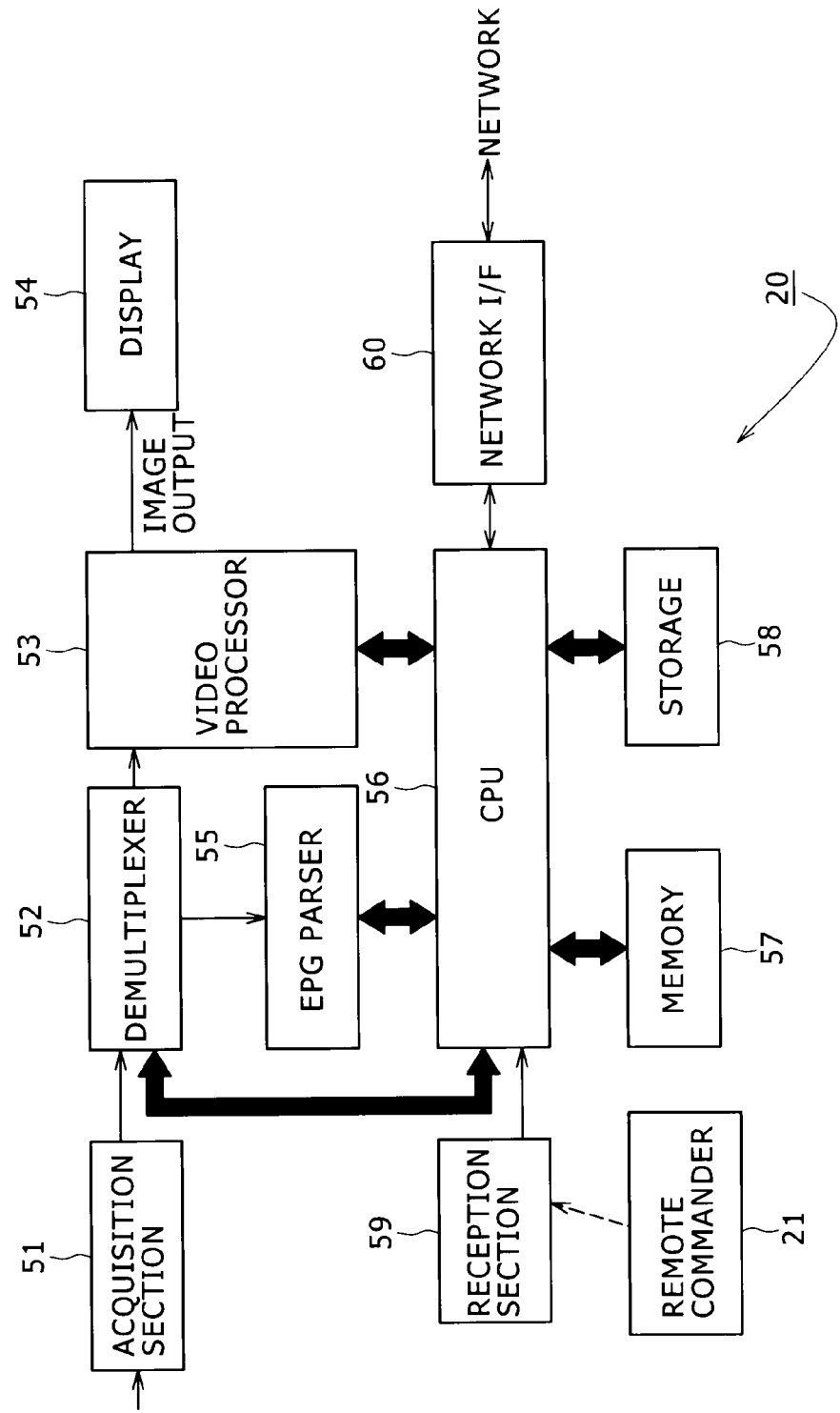
FIG. 3 is a block diagram illustrating an exemplary structure of a reception apparatus.

FIG. 3 is a block diagram illustrating an exemplary structure of the reception apparatus 20 as illustrated in FIG. 1.

The reception apparatus 20 includes an acquisition section 51, a demultiplexer 52, a video processor 53, a display 54, an EPG parser 55, a CPU 56, a memory 57, storage 58, a reception section 59, and a network interface (I/F) 60.

The acquisition section 51 acquires the transmission data from the transmission apparatus 10 (see FIG. 1), converts the transmission data into transport stream (TS) packets, and supplies the TS packets to the demultiplexer 52.

Here, in the case where the transmission apparatus 10 transmits the transmission data via the digital broadcasting, for example, the acquisition section 51 is formed by a tuner, a demodulator, and the like. Meanwhile, in the case where the transmission apparatus 10 transmits the transmission data by multicasting as in IPTV, for example, the acquisition section 51 is formed by a network I/F such as a network interface card (NIC), for example.

The demultiplexer 52 separates, from the TS packets supplied from the acquisition section 51, TS packets in which data of a section such as the PSI/SI information is arranged, and supplies the separated TS packets to the EPG parser 55.

In addition, under control of the CPU 56, the demultiplexer 52 separates, from the TS packets supplied from the acquisition section 51, TS packets in which program data of a specific program (e.g., a program on a channel selected by the user by operating the remote commander 21) is arranged. Then, the demultiplexer 52 supplies, to the video processor 53, TS packets in which image data of the program data is arranged. TS packets in which audio data of the program data is arranged are supplied to an audio processor (not shown) and processed therein.

The video processor 53 is formed by a video decoder for decoding the image data, a graphics processor for performing a graphics process (not shown), and so on.

The video processor 53 decodes the image data arranged in the TS packets supplied from the demultiplexer 52 in accordance with an MPEG (Moving Picture Experts Group) system, for example, and supplies the resulting image data to the display 54.

In addition, under control of the CPU 56, the video processor 54 generates image data for displaying the EPG and the like, for example, and supplies the generated image data to the display 54.

The display 54 is formed by a liquid crystal display (LCD), an organic electro-luminescence (EL) panel, or the like, for example. In accordance with the image data supplied from the video processor 53, the display 54 displays images of the program, the EPG, and so on corresponding to the image data.

The EPG parser 55 extracts, from the TS packets in which the data of the section is arranged and which has been supplied from the demultiplexer 52, the EPG data for the predetermined period of time, i.e., eight days, and other necessary data, and supplies the extracted data to the CPU 56.

The CPU 56 executes a program stored in the memory 57 to perform various processes including control of each of the blocks constituting the reception apparatus 20.

Specifically, the CPU 56, for example, receives the EPG data for eight days which had been included in the transmission data and is now supplied from the EPG parser 55, and supplies the received EPG data to the storage 58 to be stored therein.

In addition, an operation signal corresponding to the operation on the remote commander 21 is supplied from the reception section 59 to the CPU 56. In the case where the operation signal supplied from the reception section 59 is an operation signal for selecting the channel, for example, the CPU 56 accordingly controls the demultiplexer 52 to separate, from the TS packets supplied from the acquisition section 51, TS packets in which program data of a specified program is arranged.

In addition, in the case where the operation signal supplied from the reception section 59 is an operation signal for requesting display of the EPG, the CPU 56 accordingly controls the video processor 53 to cause the display 54 to display the EPG.

Further, in the case where the operation signal supplied from the reception section 59 is an operation signal for specifying a program displayed on the EPG, the CPU 56 accordingly selects that program as the selected program.

In the case where the selected program has been selected, the CPU 56 extracts, as the search word, the title of the selected program or the like from the program information of the selected program included in the EPG data stored in the storage 58, i.e., the EPG data for eight days which had been included in the transmission data, and the like. Then, the CPU 56 transmits the search word to the program server 30 (see FIG. 1) via the network I/F 60, and thereby requests the program server 30 to search for the related program related to the selected program.

In addition, the CPU 56 receives the program information including the program identification ID of the related program from the program server 30 via the network I/F 60, and supplies the received program information to the storage 58 to be stored therein.

Further, the CPU 56 uses the program identification ID included in the program information stored in the storage 58 to identify the program, and performs the program related process targeted at that program.

The memory 57 stores the program to be executed by the CPU 56. Besides, the memory 57 temporarily stores other data necessary for the processing by the CPU 56 and so on.

The storage 58 is formed by an HD, a memory, or the like. For example, the storage 58 stores the EPG data for eight days (or the program information included therein) which had been included in the transmission data and has been supplied from the CPU 56, the program information of the related program, and so on.

The reception section 59 receives the operation signal from the remote commander 21, and supplies the received operation signal to the CPU 56. The operation signal is transmitted from the remote commander 21 in a wireless manner, e.g., using infrared rays, when the user has operated the remote commander 21.

Under control of the CPU 56, the network I/F 60 controls the communication with the program server 30 (see FIG. 1) and so on via the network.

FIG. 4 is a block diagram illustrating an exemplary structure of the program server 30 as illustrated in FIG. 1.

The program server 30 includes an EPG data management server 71, an EPG database 72, an ID management server 73, a related program search server 74, a memory 75, and an authentication server 76.

The EPG data management server 71 acquires the EPG data from the EPG providing server, and supplies the acquired EPG data to the EPG database 72 to update a content stored in the EPG database 72.

The EPG database 72 stores the EPG data supplied from the EPG data management server 71.

The ID management server 73 associates a management ID (which will be described later) of a program corresponding to the program information included in the EPG data stored in the EPG database 72 with the event ID (or the set of the event ID and the service ID) of that program as the program identification ID thereof, and registers them in a table (hereinafter referred to as an "ID table" as appropriate).

In addition, in response to a request from the related program search server 74, the ID management server 73 detects, from the ID table, the event ID of the related program as the program identification ID thereof, and supplies the detected event ID to the related program search server 74.

Note that the EPG data stored in the EPG database 72 may include program information of a program to which the event ID as the program identification ID has not been assigned yet. For such a program to which the event ID as the program identification ID has not been assigned yet, the ID management server 73 registers the management ID of that program in the ID table.

The related program search server 74 receives the search word of the selected program from the reception apparatus 20 (the network I/F 60 therein (see FIG. 3)) via the authentication server 76. Then, the related program search server 74 uses the search word as a keyword to search for the related program related to the selected program, with the programs corresponding to the program information included in the EPG data stored in the EPG database 72 as a target of the search.

Specifically, the related program search server 74 retrieves, from the program information included in the EPG data stored in the EPG database 72, a text that matches the search word, for example, and recognizes a program corresponding to program information containing that text as a related program.

In addition, the related program search server 74 retrieves a text that matches a synonym or abbreviation for the search word, and recognizes a program corresponding to program information containing that text as a related program. Here, in the case where the search word is "American football game," for example, "Amefuto" is a synonym for the search word.

After the retrieval of the related program, the related program search server 74 requests the program identification ID of the related program from the ID management server 73, and thereby acquires the program identification ID of the related program from the ID management server 73.

Then, the related program search server 74 adds the program identification ID of the related program to the program information of the related program stored in the EPG database 72, and provides (transmits) them, as a result of the search for the related program, to the reception apparatus 20 via the authentication server 76.

The memory 75 stores information necessary for the related program search server 74 to perform the search for the related program, and this information is referred to by the related program search server 74. Specifically, the memory 75 stores a dictionary in which synonyms, abbreviations, and so on for various words are registered, for example. When performing the search for the related program, the related program search server 74 refers to the dictionary stored in the memory 75 to recognize the synonym, abbreviation, and so on for the search word.

Upon receipt of the search word transmitted from the reception apparatus 20, the authentication server 76 authenticates the reception apparatus 20 as appropriate. When the authentication of the reception apparatus 20 is successful, the authentication server 76 permits data exchange between the related program search server 74 and the reception apparatus 20, whereas when the authentication of the reception apparatus 20 is not successful, the authentication server 76 prohibits the data exchange between the related program search server 74 and the reception apparatus 20.

Note here that the authentication server 76 may be provided in the case where the service of the program server 30 is to be offered to users who have been registered previously, for example. In other words, in the case where use of the service of the program server 30 is not limited to particular users, the program server 30 may not be provided with the authentication server 76.

Note that the program server 30, which is a server on the network such as the Internet, and the EPG providing server are capable of handling a greater data amount (volume) of EPG data than in the case where the EPG data is included in the transmission data and transmitted from the transmission apparatus 10 in accordance with an ARIB standard such as in the digital broadcasting.

Thus, while the EPG data transmitted from the transmission apparatus 10 covers eight days as described above, the EPG data acquired by the program server 30 from the EPG providing server covers a greater number of days.

Moreover, it is possible to allow the program information included in the EPG data acquired by the program server 30 from the EPG providing server to be more detailed, having a larger data amount, than the program information included in the EPG data transmitted from the transmission apparatus 10.

Specifically, in the case where the program information included in the EPG data transmitted from the transmission apparatus 10 includes names of some performers in the program, for example, it is possible to allow the program information included in the EPG data acquired by the program server 30 from the EPG providing server to include names of all the performers in the program.

Also, in the case where the program information included in the EPG data transmitted from the transmission apparatus 10 includes no image data, for example, it is possible to allow the program information included in the EPG data acquired by the program server 30 from the EPG providing server to include image data of pictures of one or more scenes of the program, image data of a video promoting the program, or the like.

As described above, the program server 30 is capable of providing more detailed program information, as compared to the EPG data transmitted from the transmission apparatus 10.

As described above, the EPG data acquired by the program server 30 from the EPG providing server covers a greater number of days than the EPG data transmitted from the transmission apparatus 10, which covers eight days. Moreover, some pieces of the program information included in the EPG data for the 9th and subsequent days out of the EPG data acquired by the program server 30 from the EPG providing server may not include the event ID as the program identification ID, for example, because the event ID has not yet been assigned to the corresponding program.

Accordingly, the EPG data management server 71 issues, to each program whose program information is included in the EPG data acquired from the EPG providing server, a unique ID for management purposes (hereinafter referred to as the "management ID" as appropriate).

Moreover, the EPG data management server 71 adds, to each piece of program information included in the EPG data acquired from the EPG providing server, the management ID issued to the program corresponding to that piece of program information, and allows them to be stored in the EPG database 72.

Here, the management ID issued to each program by the EPG data management server 71 is provided (supplied) (transmitted) to other servers such as the ID management server 73 and the EPG providing server, and used for the management of the program (the program information thereof).

Thereafter, when the program A, which has not been assigned the event ID yet, is assigned an event ID in the broadcasting station or the like, for example, the EPG providing server updates the program information of the program A so as to include the event ID. Further, the EPG providing server generates update information composed of a set of the updated program information of the program A and the management ID of the program A, and provides (transmits) the generated update information to the EPG data management server 71.

Upon receipt of the update information from the EPG providing server, the EPG data management server 71 uses the program information included in this update information to update the program information to which a management ID that matches the management ID included in the update information is assigned, out of the program information included in the EPG data stored in the EPG database 72.

Specifically, of the program information included in the EPG data stored in the EPG database 72, the EPG data management server 71 updates the program information of the program A, which has not included the event ID, so as to include the event ID.

Further, the EPG data management server 71 supplies the update information to the ID management server 73.

The ID management server 73 receives the update information from the EPG data management server 71, and updates the ID table based on the received update information.

Specifically, based on the update information supplied from the EPG data management server 71, the ID management server 73 recognizes the program whose program information has been updated, e.g., the management ID of the program A, to which the event ID has been assigned, and registers the event ID (or the set of the event ID and the service ID) as the program identification ID of the program A in an entry (record) in the ID table at which that management ID is registered, thereby updating the ID table.

In the case where the related program has not been assigned the event ID yet, and the program information of the related program stored in the EPG database 72 does not include the event ID as the program identification ID, the program server 30 waits for the above-described updating of the EPG database 72 and the ID table using the update information to be completed with respect to the related program, and thereafter transmits the program information of the related program, which now includes the program identification ID, to the reception apparatus 20.

Next, referring to FIGS. 5A and 5B, the processes performed by the reception apparatus 20 as illustrated in FIG. 3 will now be described below.

In the reception apparatus 20, an acquisition process of acquiring the EPG data transmitted from the transmission apparatus 10, a program information related process related to the program information, and so on are performed.

Figure 5A:
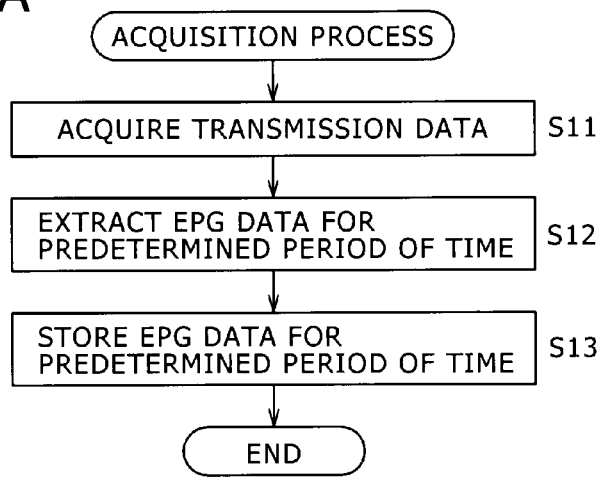
FIGS. 5A and 5B are flowcharts illustrating processes performed in the reception apparatus.

FIG. 5A is a flowchart illustrating the acquisition process.

In the reception apparatus 20 (see FIG. 3), at step S11, the acquisition section 51 receives and thereby acquires the transmission data transmitted from the transmission apparatus 10, converts the transmission data into the TS packets, and supplies the TS packets to the demultiplexer 52.

The demultiplexer 52 separates, from the TS packets supplied from the acquisition section 51, the TS packets in which the data of the section such as the PSI/SI information is arranged, and supplies the separated TS packets to the EPG parser 55. Then, control proceeds from step S11 to step S12.

At step S12, the EPG parser 55 extracts, from the TS packets supplied from the demultiplexer 52, the EPG data for the predetermined period of time, i.e., eight days, and supplies the extracted data to the CPU 56. Then, control proceeds to step S13.

At step S13, the CPU 56 receives the EPG data for eight days which had been included in the transmission data and is now supplied from the EPG parser 55, and supplies the received EPG data to the storage 58 to be stored therein. Then, this procedure is finished.

Figure 5B:
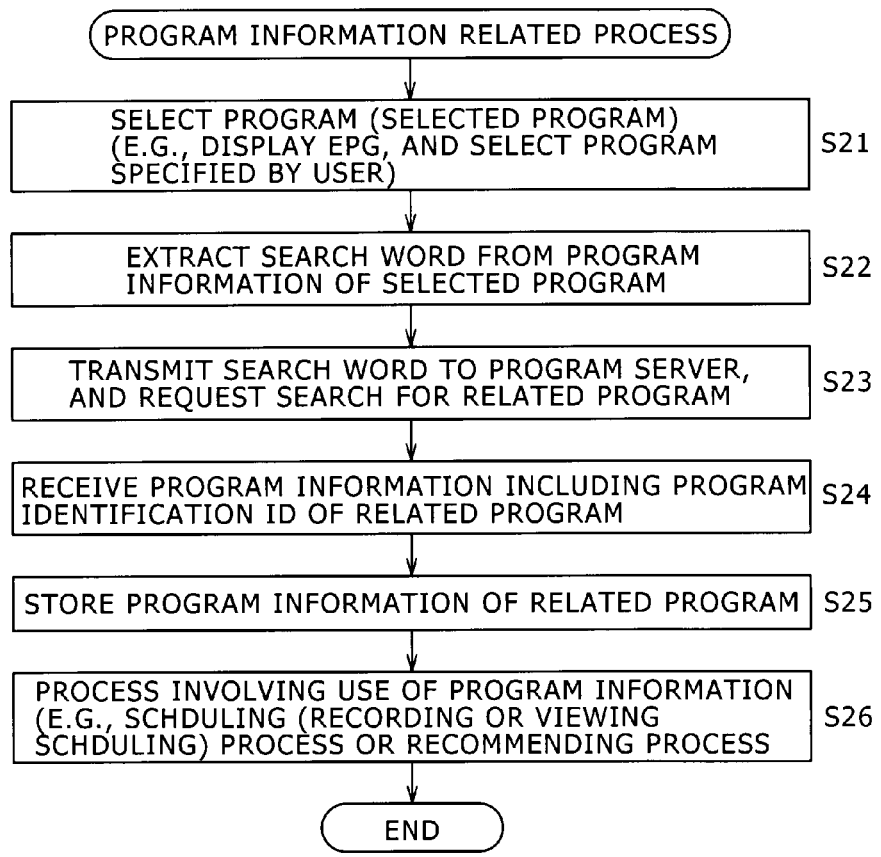

FIG. 5B is a flowchart illustrating the program information related process.

At step S21, the CPU 56 selects the specific program as the selected program in which the user is interested.

Specifically, if the user operates the remote commander 21 so as to cause the EPG to be displayed, for example, the remote commander 21 transmits the operation signal for requesting the display of the EPG. The operation signal transmitted by the remote commander 21 is received by the reception section 59 and supplied to the CPU 56.

In accordance with the operation signal for requesting the display of the EPG supplied from the reception section 59, the CPU 56 controls the video processor 53 based on the EPG data stored in the storage 58 to allow the display 54 to display the EPG.

If the user, viewing the EPG displayed on the display 54, operates the remote commander 21 so as to specify the program displayed on the EPG to select the program, schedule the viewing of the program, or schedule the recording of the program, for example, the remote commander 21 transmits the operation signal for specifying that program. The operation signal transmitted by the remote commander 21 is received by the reception section 59 and supplied to the CPU 56.

In accordance with the operation signal supplied from the reception section 59, the CPU 56 selects the program specified by the operation signal as the selected program.

Note here that, at step S21, a program that is expected to interest the user, such as a program that has been viewed by the user for longer than a predetermined time, a program the viewing of which has been scheduled, or a program the recording of which has been scheduled, for example, may also be selected as the selected program.

In the case where remote scheduling is possible, i.e., in the case where the user, when away from home, is allowed to schedule the recording of a program with the reception apparatus 20 via a web page for providing the EPG, for example, the CPU 56 may select that recording-scheduled program as the selected program.

Thereafter, control proceeds from step S21 to step S22. At step S22, the CPU 56 extracts, as the search word, the title or the like of the selected program from the program information of the selected program out of the pieces of program information stored in the storage 58. Then, control proceeds to step S23.

At step S23, the CPU 56 transmits the search word to the program server 30 via the network I/F 60, and thereby requests the program server 30 (see FIG. 1) to search for the related program related to the selected program.

Thereafter, the CPU 56 waits for the program information including the event ID (or the set of the event ID and the service ID) as the program identification ID of the related program to be transmitted from the program server 30, and at step S24, receives the program information of the related program from the program server 30 via the network I/F 60.

Then, control proceeds from step S24 to step S25. At step S25, the CPU 56 supplies the program information including the program identification ID of the related program as received from the program server 30 to the storage 58 to be stored therein. Then, control proceeds to step S26.

At step S26, the CPU 56 identifies the program based on the program identification ID included in the program information stored in the storage 58, and performs the program related process targeted at that program. Then, this procedure is finished.

Specifically, the CPU 56 identifies the related program based on the program identification ID included in the program information of the related program, and uses this program identification ID to perform the process of scheduling the recording of the related program, the process of scheduling the viewing of the related program, the process of recommending the recording, viewing, or the like of the related program, or the like.

Next, referring to FIGS. 6A and 6B, the processes performed by the program server 30 as illustrated in FIG. 4 will now be described below.

In the program server 30, an EPG data collecting process of acquiring (collecting) the EPG data provided by the EPG providing server, a program information providing process of providing the program information in accordance with the request from the reception apparatus 20, and so on are performed.

Figure 6A:
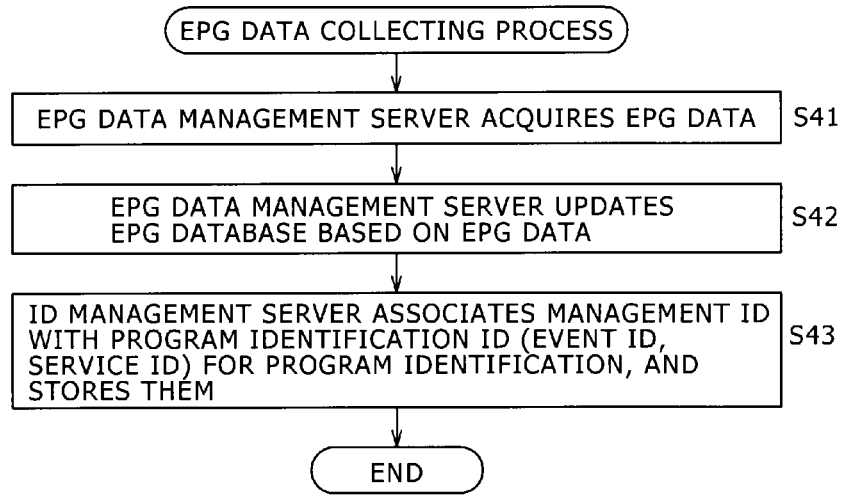
FIGS. 6A and 6B are flowcharts illustrating processes performed in the program server.

FIG. 6A is a flowchart illustrating the EPG data collecting process.

In the program server 30, the EPG data management server 71 waits for the EPG data for a longer period of time than eight days to be provided from the EPG providing server, and at step S41, receives and thereby acquires the EPG data. Then, control proceeds to step S42.

At step S42, the EPG data management server 71 updates the content stored in the EPG database 72 based on the EPG data provided from the EPG providing server. Then, control proceeds to step S43.

Specifically, the EPG data management server 71 issues the management ID to the program whose program information is included in the EPG data acquired from the EPG providing server, for example. Further, the EPG data management server 71 adds, to the program information included in the EPG data acquired from the EPG providing server, the management ID issued to the program corresponding to that program information, and allows them to be stored in the EPG database 72.

At step S43, the ID management server 73 associates the management ID of the program whose program information and management ID have been stored in the EPG database 72 with the program identification ID, such as the event ID, included in the program information of that program, and registers them in the ID table. Then, this procedure is finished.

Figure 6B:
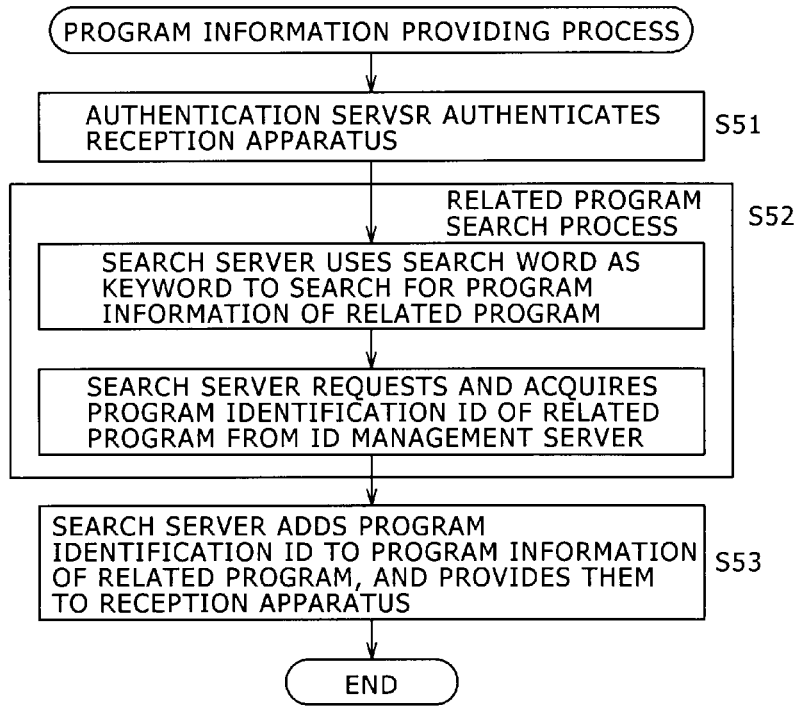

FIG. 6B is a flowchart illustrating the program information providing process.

The authentication server 76 waits for the search word to be transmitted from the reception apparatus 20, and thereafter authenticates the reception apparatus 20 as appropriate at step S51. If the authentication of the reception apparatus 20 is not successful, this procedure is finished.

Meanwhile, if the authentication of the reception apparatus 20 is successful, the authentication server 76 supplies the search word transmitted from the reception apparatus 20 to the related program search server 74.

Then, control proceeds from step S51 to step S52. At step S52, the related program search server 74 performs a related program search process. The related program search process is a process of using the search word transmitted from the reception apparatus 20 to search for a program whose program information includes a text that matches the search word, for example, as the related program of the selected program.

The related program search process is performed using the search word transmitted from the reception apparatus 20 as a keyword to search for the related program related to the selected program, with the programs corresponding to the program information included in the EPG data stored in the EPG database 72 as the target of the search.

Specifically, the related program search server 74 searches through the pieces of program information stored in the EPG database 72, for example, for a piece of program information including the text that matches the search word, and acquires that piece of program information and the management ID associated with that piece of program information (i.e., the management ID of the related program) from the EPG database 72.

Further, the related program search server 74 supplies the management ID of the related program to the ID management server 73, and thereby requests the program identification ID of the related program from the ID management server 73.

In response to the request from the related program search server 74, the ID management server 73 reads, from the ID table, the program identification ID associated with the management ID (i.e., the management ID of the related program) supplied from the related program search server 74, and supplies the read program identification ID to the related program search server 74.

The related program search server 74 receives and thereby acquires the program identification ID of the related program as supplied from the ID management server 73 in the above-described manner. Then, control proceeds from step S52 to step S53.

At step S53, the related program search server 74 adds the program identification ID of the related program acquired from the ID management server 73 to the program information of the related program retrieved from the EPG database 72, and provides (transmits) them, as the result of the search for the related program, to the reception apparatus 20 via the authentication server 76. Then, this procedure is finished.

Note that the program information of the related program to be provided from the related program search server 74 to the reception apparatus 20 may either include the program identification ID of the related program or include the program identification ID and other information such as the title of the related program, for example.

Specifically, in the reception apparatus 20 (see FIG. 3), the EPG data for eight days as transmitted from the transmission apparatus 10 is stored in the storage 58. Therefore, in the case where the related program is a program that is to be broadcast within eight days, the information such as the title of the related program is already stored in the storage 58. Accordingly, in this case, the program information of the related program to be provided from the related program search server 74 to the reception apparatus 20 may include the program identification ID.

Meanwhile, in the case where the related program is a program that is to be broadcast more than eight days later (counting from the present), the information such as the title of the related program may not be stored in the storage 58. Accordingly, in this case, the program information of the related program to be provided from the related program search server 74 to the reception apparatus 20 may include the program identification ID and the other information such as the title of the related program.

It has been assumed in FIG. 6B that the program server 30 searches for the program corresponding to the program information including the text that matches the search word of the selected program, as the related program. Note, however, that other programs may be searched for as the related program related to the selected program.

Specifically, it is possible, for example, that in the program server 30, users with similar tastes be classified into the same group based on search keywords or the like, and that a program that has been retrieved as the related program for a certain user be also retrieved as the related program for other users belonging to the same group as the certain user.

As described above, the reception apparatus 20, which acquires the EPG data for eight days from the transmission apparatus 10, selects the program in which the user is interested or the like as the selected program and, assuming that the user will be interested in the related program related to the selected program, receives the program information including the program identification ID of the related program from the program server 30, which is a server on the network such as the Internet. Further, the reception apparatus 20 identifies the related program based on the program identification ID included in the program information transmitted from the program server 30, and performs the program related process targeted at the related program.

Meanwhile, the program server 30 acquires, from the EPG providing server for providing the EPG data, the EPG data for the longer period of time than eight days, and allows the acquired EPG data to be stored in the EPG database 72. Further, the program server 30 uses the search word transmitted from the reception apparatus 20 as a keyword to search for the related program related to the selected program, with the programs corresponding to the program information included in the EPG data stored in the EPG database 72 as the target of the search, and provides the program information including the program identification ID of the related program obtained as a result of the search to the reception apparatus 20.

Therefore, the reception apparatus 20 is capable of accurate identification of a specific program from among an increased number of programs.

In other words, the reception apparatus 20 is capable of acquiring the program information of a program which is likely to interest the user and which is not included in the EPG data for eight days transmitted from the transmission apparatus 10, i.e., a program that is to be broadcast more than eight days later.

Moreover, the reception apparatus 20 is capable of accurately identifying the related program by using the event ID (or the set of the event ID and the service ID) as the program identification ID.

This contributes to preventing a failure in the scheduling of the recording of the related program or the like.

Specifically, even in the case where the broadcast start time of the related program has been changed after the scheduling of the recording of the related program, for example, the related program is accurately identified using the program identification ID thereof to allow recognition of the change in the broadcast start time, and the scheduled recording of the related program will be successfully achieved.

Also, in the case where the related program is an episode of a weekly series program which is broadcast in a particular week and addresses a particular theme, for example, the scheduled recording of that episode of the series program which is broadcast in the particular week can be performed, while preventing scheduled recording of other episodes of the series program which are broadcast in other weeks and address themes that are not likely to interest the user (i.e., a failed scheduled recording).

As described above, the accurate identification of the related program prevents a failed scheduled recording, and reduces the frequency of unwanted recording (e.g., recording of programs that do not interest the user), which allows efficient use of a recording medium such as an HD used to record the programs.

A prescribed program may be installed into a computer (personal computer (PC)) capable of receiving the digital broadcasting or IPTV to allow the computer to perform the above-described series of processes.

FIG. 7 illustrates an exemplary structure of a computer into which the program for performing the above-described series of processes is installed, according to an embodiment of the present invention.

The program may be stored beforehand in a hard disk 105 or a ROM 103 as recording media contained in the computer.

Alternatively, the program may be stored (recorded) temporarily or permanently in a removable recording medium 111, such as a flexible disk, a compact disc read-only memory (CD-ROM), a magneto-optical (MO) disk, a digital versatile disc (DVD), a magnetic disk, or a semiconductor memory. The removable recording medium 111 can be provided as so-called package software.

The program may be installed from the removable recording medium 111 as described above into the computer. Alternatively, the program may be transferred from a downloading site to the computer in a wireless manner via an artificial satellite designed for digital satellite broadcasting purposes, or in a wired manner via a network such as a local area network (LAN) or the Internet. In this case, the computer can receive the program transferred in any of the above-described manners via a communication section 108, and install the program into the hard disk 105 contained therein.

The computer contains a central processing unit (CPU) 102. An input/output interface 110 is connected to the CPU 102 via a bus 101. If the user operates an input section 107 formed by a keyboard, a mouse, a microphone, and so on so as to issue an instruction to execute the program, for example, the instruction is inputted to the CPU 102 via the input/output interface 110. In accordance with this instruction, the CPU 102 executes the program stored in the read-only memory (ROM) 103. Alternatively, the CPU 102 may load, into a random access memory (RAM) 104, the program stored in the hard disk 105, the program transferred from the satellite or the network, received by the communication section 108, and installed into the hard disk 105, or the program read from the removable recording medium 111 mounted on a drive 109 and installed into the hard disk 105, and execute the program. As a result, the CPU 102 performs any of the procedures according to the above-described flowcharts, or the procedures implemented by the configuration as illustrated in the block diagrams as described above. Then, the CPU 102, as necessary, outputs a result of the procedure through an output section 106 formed by a liquid crystal display (LCD), a loudspeaker, and so on via the input/output interface 110, for example. Alternatively, the CPU 102 may transmit the result of the procedure via the communication section 108, or record the result of the procedure on the hard disk 105, for example.

Note that the processing steps implemented by the program for causing the computer to perform the various processes and described in the present specification may not necessarily be performed chronologically in order of description in accordance with the flowcharts. Some steps may be performed in parallel or independently of one another (e.g., parallel processing or object processing).

Note that the program may be processed either by one computer or by a plurality of computers in a distributed manner. Also note that the program may be transferred to and executed by a remote computer.

Note that embodiments of the present invention are not limited to the embodiments described above. It should be understood by those skilled in the art that various modifications, combinations, sub-combinations and alterations may occur depending on design requirements and other factors insofar as they are within the scope of the appended claims or the equivalents thereof.

For example, embodiments of the present invention are applicable to programs that are transmitted in accordance with integrated services digital broadcasting (ISDB), digital video broadcasting (DVB), or other standards, for example.

The present application contains subject matter related to that disclosed in Japanese Priority Patent Application JP 2008-165635 filed in the Japan Patent Office on Jun. 25, 2008, the entire content of which is hereby incorporated by reference.

What is claimed is:

1. An information processing apparatus, comprising:
circuitry configured to
receive, from an external remote device, an instruction to schedule recording of a selected program,
extract, from program information of the selected program included in electronic program guide data for a predetermined period of time, a search word to be used as a keyword for search,
transmit the search word to a program server for searching for a program in extended electronic program guide data provided by the program server, the extended electronic program guide data being displayed on a web page and including data for a period of time that is extended past the predetermined period of time of the electronic program guide data,
receive, from the program server when a program identification ID has been assigned, program information including the program identification ID for identifying a related program related to the selected program obtained as a result of a search for the related program performed in the extended electronic program guide data using the search word as the keyword, the program identification ID corresponding to a set of a service identification of a service corresponding to a channel and an event identification that uniquely identifies the related program and that uniquely identifies a particular episode when the related program is a series program, the program identification ID being different from a title of the related program, and the program identification ID being included in the program information of the extended electronic program guide data, which was searched through by the program server,
receive, from the program server when the program identification ID has not yet been assigned, the program information including the channel, broadcast start time, and broadcast end time for identifying the related program,
identify the related program by using the program information, and
display information of the particular episode, which is a subset of the series program, when the identified related program is the series program, wherein
the program information received from the program server includes the program identification ID and image data of one of a scene of the related program and a video associated with the related program.

2. The information processing apparatus according to claim 1, wherein the circuitry performs a process of scheduling recording of, scheduling viewing of, or recommending the related program identified by using the program information.

3. The information processing apparatus according to claim 1, wherein the program identification ID uniquely identifies the related program regardless of a change in a broadcast start time of the related program.

4. An information processing method employed by an information processing apparatus including circuitry, the method comprising:
    receiving, from an external remote device, an instruction to schedule recording of a selected program;
    extracting, from program information of the selected program included in electronic program guide data for a predetermined period of time, a search word to be used as a keyword for search;
    transmitting the search word to a program server for searching for a program in extended electronic program guide data provided by the program server, the extended electronic program guide data being displayed on a web page and including data for a period of time is extended past the predetermined period of time of the electronic program guide data;
    receiving using the circuitry, from the program server when a program identification ID has been assigned, program information including the program identification ID for identifying a related program related to the selected program obtained as a result of a search for the related program performed in the extended electronic program guide data using the search word as the keyword, the program identification ID corresponding to a set of a service identification of a service corresponding to a channel and an event identification that uniquely identifies the related program and that uniquely identifies a particular episode when the related program is a series program, the program identification ID being different from a title of the related program, and the program identification ID being included in the program information of the extended electronic program guide data, which was searched through by the program server;
    receiving, from the program server when the program identification ID has not yet been assigned, the program information including the channel, broadcast start time, and broadcast end time for identifying the related program;
    identifying the related program by using the program information; and
    displaying information of the particular episode, which is a subset of the series program, when the identified related program is the series program, wherein
    the program information received from the program server includes the program identification ID and image data of one of a scene of the related program and a video associated with the related program.

5. A non-transitory computer-readable storage medium including computer executable instructions, wherein the instructions, when executed by a computer, cause the computer to perform a method of information processing, the method comprising:
    receiving, from an external remote device, an instruction to schedule recording of a selected program;
    extracting, from program information of the selected program included in electronic program guide data for a predetermined period of time, a search word to be used as a keyword for search;
    transmitting the search word to a program server for searching for a program in extended electronic program guide data provided by the program server, the extended electronic program guide data being displayed on a web page and including data for a period of time that is extended past the predetermined period of time of the electronic program guide data;
    receiving, from the program server when a program identification ID has been assigned, program information including the program identification ID for identifying a related program related to the selected program obtained as a result of a search for the related program performed in the extended electronic program guide data using the search word as the keyword, the program identification ID corresponding to a set of a service identification of a service corresponding to a channel and an event identification that uniquely identifies the related program and that uniquely identifies a particular episode when the related program is a series program, the program identification ID being different from a title of the related program, and the program identification ID being included in the program information of the extended electronic program guide data, which was searched through by the program server;
    receiving, from the program server when the program identification ID has not vet been assigned, the program information including the channel, broadcast start time, and broadcast end time for identifying the related program;
    identifying the related program by using the program information; and
    displaying information of the particular episode, which is a subset of the series program, when the identified related program is the series program, wherein
    the program information received from the program server includes the program identification ID and image data of one of a scene of the related program and a video associated with the related program.

6. A system, comprising:
a remote device configured to send an instruction to schedule recording of a selected program; and.
an apparatus that is external to the remote device and that includes circuitry configured to
    receive, from the remote device, the instruction to schedule recording of the selected program,
    extract, from program information of the selected program included in electronic program guide data for a predetermined period of time, a search word to be used as a keyword for search,
    transmit the search word to a program server for searching for a program in extended electronic program guide data provided by the program server, the extended electronic program guide data being displayed on a web page and including data for a period of time that is extended past the predetermined period of time of the electronic program guide data,
    receive, from the program server when a program identification ID has been assigned, program information including the program identification ID for identifying a related program related to the selected program obtained as a result of a search the related program performed in the extended electronic program guide data using the search word as the keyword, the program identification ID corresponding to a set of a service identification of a service corresponding to a channel and an event identification that uniquely identifies the related program and that uniquely identifies a particular episode when the related program is a series program, the program identification ID being different from a title of the related program, and the program identification ID being included in the program information of the extended electronic program guide data, which was searched through by the program server, receive, from the program server when the program identification ID has not yet been assigned, the program information including the channel, broadcast start time, and broadcast end time for identifying the related program, identify the related program by using the program information, and display information of the particular episode, which is a subset of the series program, when the identified related program is the series program, wherein the program information received from the program server includes the program identification ID and image data of one of a scene of the related program and a video associated with the related program.

7. The system according to claim 6, wherein the circuitry is further configured to perform a process of scheduling recording of, scheduling viewing of, or recommending the related program identified by using the program information.

8. The system according to claim 6, wherein the program identification ID uniquely identifies the related program regardless of a change in a broadcast start time of the related program.

9. The system according to claim 6, further comprising:
the program server, wherein
the program server is configured to perform the search for the related program related to the selected program using the search word, a synonym for the search word, and an abbreviation for the search word.

10. The information processing apparatus according to claim 1, wherein the program information received from the program server includes the program identification ID and the image data of the scene of the related program.

11. The information processing apparatus according to claim 1, wherein the program information received from the program server includes the program identification ID and the image data of the video associated with the related program.

* * * * *